(12) United States Patent
Ballantine

(10) Patent No.: US 12,413,074 B2
(45) Date of Patent: Sep. 9, 2025

(54) SYSTEMS AND TECHNIQUES FOR RENEWABLE ENERGY GENERATION

(71) Applicant: Ohmium International, Inc., Incline Village, NV (US)

(72) Inventor: Arne Ballantine, Incline Village, NV (US)

(73) Assignee: Ohmium International, Inc., Newark, CA (US)

( * ) Notice: Subject to any disclaimer, the term of this patent is extended or adjusted under 35 U.S.C. 154(b) by 450 days.

(21) Appl. No.: 18/076,103

(22) Filed: Dec. 6, 2022

(65) Prior Publication Data
US 2023/0178993 A1    Jun. 8, 2023

Related U.S. Application Data

(60) Provisional application No. 63/286,707, filed on Dec. 7, 2021.

(51) Int. Cl.
*H02J 3/38* (2006.01)
*G01W 1/10* (2006.01)
(Continued)

(52) U.S. Cl.
CPC .............. *H02J 3/381* (2013.01); *G01W 1/10* (2013.01); *H02J 3/003* (2020.01); *H02J 9/00* (2013.01);
(Continued)

(58) Field of Classification Search
CPC .... H02J 3/381; H02J 3/003; H02J 9/00; H02J 15/008; H02J 2300/20; H02J 2300/22;
(Continued)

(56) References Cited

U.S. PATENT DOCUMENTS 8,669,499 B2    3/2014  Conrad
11,532,943 B1 *  12/2022  Zauli .................. H02J 3/32
(Continued)

FOREIGN PATENT DOCUMENTS

CN    108599245 B  *  8/2020   ....... G06Q 10/06312
DK    201670958 A1 *  6/2018   ................ H02J 3/00
(Continued)

OTHER PUBLICATIONS

English Translation of "CN-108599245-B" (Year: 2020).*
(Continued)

*Primary Examiner* — Charles R Kasenge
(74) *Attorney, Agent, or Firm* — Polsinelli LLP

(57) ABSTRACT

The present disclosure generally relates to systems and techniques for power generation. In some aspects, the techniques described herein relate to a method for power generation, including: receiving a forecast of weather impacting renewable energy generation configured to provide power to a load; distributing energy between a plurality of energy storage equipment based on the forecast of the weather, the plurality of energy storage equipment including different types of storage equipment; selecting one of the plurality of energy storage equipment based on the forecast of the weather; and controlling distribution of power from the selected one of the plurality of energy storage equipment to the load.

12 Claims, 4 Drawing Sheets

(51) Int. Cl.
  *H02J 3/00* (2006.01)
  *H02J 9/00* (2006.01)
  *H02J 15/00* (2006.01)
(52) U.S. Cl.
  CPC ......... *H02J 15/008* (2020.01); *H02J 2300/20* (2020.01)
(58) Field of Classification Search
  CPC .......... H02J 2300/40; H02J 3/004; H02J 3/28; H02J 3/32; H02J 7/35; H02J 2300/24; H02J 2300/28; G01W 1/10; Y02E 70/30
  See application file for complete search history.

(56) References Cited

U.S. PATENT DOCUMENTS

| | | | | |
|---|---|---|---|---|
| 2011/0120447 A1* | 5/2011 | Sobolewski | .......... | F24S 30/425 126/714 |
| 2016/0320787 A1 | 11/2016 | Carlson | | |
| 2016/0322835 A1* | 11/2016 | Carlson | ..................... | H02J 7/35 |
| 2020/0006942 A1* | 1/2020 | Lansing, Jr. | .............. | H02J 3/28 |
| 2020/0116126 A1* | 4/2020 | Jamuna | ................. | F03D 7/0224 |
| 2021/0301787 A1* | 9/2021 | Brombach | .............. | H02J 3/001 |

FOREIGN PATENT DOCUMENTS

| WO | 2018236649 A1 | 12/2018 |
|---|---|---|
| WO | WO 2023/107495 | 6/2023 |

OTHER PUBLICATIONS

PCT Application No. PCT/US22/52018 International Search Report dated Mar. 21, 2023.
PCT Application No. PCT/US2022/052018, International Preliminary Report on Patentability dated Jun. 20, 2024.

\* cited by examiner

SYSTEMS AND TECHNIQUES FOR RENEWABLE ENERGY GENERATION

CROSS-REFERENCE TO RELATED APPLICATION

The present application claims priority to U.S. provisional application No. 63/286,707, filed on Dec. 7, 2021, which is incorporated by reference herein in its entirety.

FIELD

The present disclosure generally relates to systems and techniques for power generation. For example, aspects of the present disclosure include systems and techniques for managing renewable energy power based on weather sensing.

BACKGROUND

Renewable energy sources are becoming important for sourcing of power in various applications. Some renewable energy sources are dependent on weather conditions, such as the presence of wind or sunlight. At the same time, there has been a rapid growth in the hydrogen industry. For example, hydrogen generation systems, particularly electrolyzers, are becoming increasingly more common. As capacity for hydrogen generation increases at a single site and multiple generators are connected in parallel, controlling hydrogen production to meet demand at a site becomes more complex, particularly when the hydrogen is consumed intermittently or when production relies on time-varying input resources.

SUMMARY

In some aspects, the techniques described herein relate to a method for power generation, including: receiving a forecast of weather impacting renewable energy generation configured to provide power to a load: distributing energy between a plurality of energy storage equipment based on the forecast of the weather, the plurality of energy storage equipment including different types of storage equipment: selecting one of the plurality of energy storage equipment based on the forecast of the weather; and controlling distribution of power from the selected one of the plurality of energy storage equipment to the load.

In some aspects, the techniques described herein relate to an apparatus for power generation, including: a memory; and one or more processors coupled to the memory, the one or more processors being configured to: receive a forecast of weather impacting renewable energy generation configured to provide power to a load: distribute energy between a plurality of energy storage equipment based on the forecast of the weather, the plurality of energy storage equipment including different types of storage equipment: select one of the plurality of energy storage equipment based on the forecast of the weather; and control distribution of power from the selected one of the plurality of energy storage equipment to the load.

In some aspects, the techniques described herein relate to a non-transitory computer-readable medium having instructions stored thereon, that when executed by one or more processors, cause the one or more processors to: receive a forecast of weather impacting renewable energy generation configured to provide power to a load: distribute energy between a plurality of energy storage equipment based on the forecast of the weather, the plurality of energy storage equipment including different types of storage equipment: select one of the plurality of energy storage equipment based on the forecast of the weather; and control distribution of power from the selected one of the plurality of energy storage equipment to the load.

BRIEF DESCRIPTION OF THE DRAWINGS

Illustrative embodiments of the present application are described in detail below with reference to the following drawing figures.

DETAILED DESCRIPTION

Large-scale renewable projects face the challenge of creating a consistent power output. In large-scale renewable projects of the prior art, transducing energy from one mode to another has not been considered other than such transduction of a single dimension-such as hybridizing photovoltaic power production with lithium-ion energy storage.

Certain aspects of the present disclosure provide a matrix of renewable energy inputs and energy storage modes within which energy may be transferred to facilitate a consistent energy output. The matrix of devices may include power electronics, heat engines, electrolyzers and fuel cell generators that are positioned to move energy into and out of nodes of the matrix, as described in more detail herein.

Figure 1:
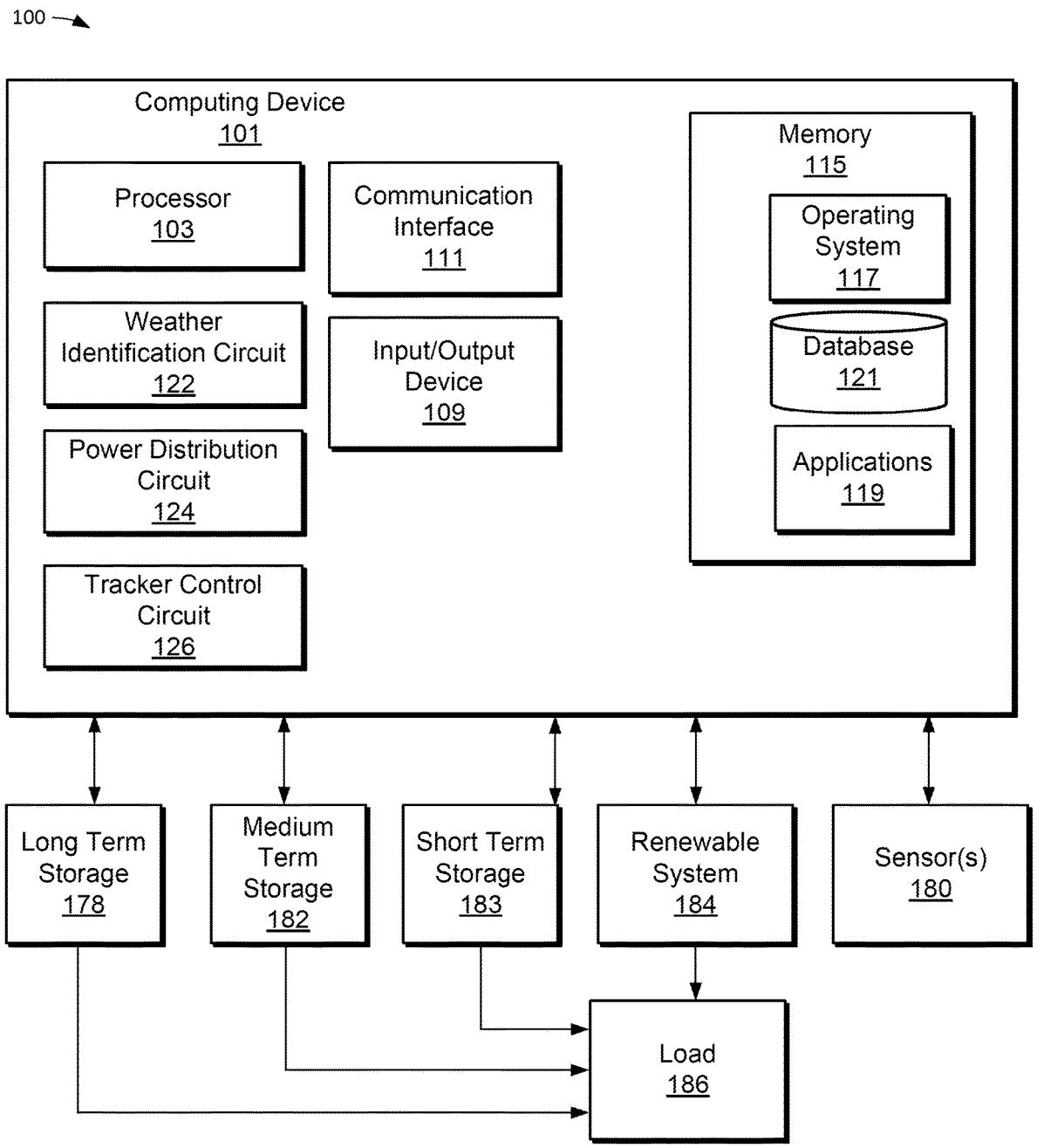
FIG. 1 illustrates a power generation system, in accordance with certain aspects of the present disclosure.

FIG. 1 illustrates a power generation system 100, in accordance with certain aspects of the present disclosure. In some aspects, the power generation system 100 may include a computing device 101, as shown. The computing device 101 can include a processor 103 for controlling overall operation of the computing device 101 and its associated components, including input/output device 109, communication interface 111, and/or memory 115. A data bus can interconnect processor(s) 103, memory 115, I/O device 109, and/or communication interface 111.

Input/output (I/O) device 109 can include a microphone, keypad, touch screen, and/or stylus through which a user of the computing device 101 can provide input and can also include one or more of a speaker for providing audio output and a video display device for providing textual, audiovisual, and/or graphical output. Software can be stored within memory 115 to provide instructions to processor 103 allowing computing device 101 to perform various actions. For example, memory 115 can store software used by the computing device 101, such as an operating system 117, application programs 119, and/or an associated internal database 121. The various hardware memory units in memory 115 can include volatile and nonvolatile, removable, and non-removable media implemented in any method or technology for storage of information such as computer-readable instructions, data structures, program modules or other data. Memory 115 can include one or more physical persistent memory devices and/or one or more non-persistent memory devices. Memory 115 can include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Communication interface 111 can include one or more transceivers, digital signal processors, and/or additional circuitry and software for communicating via any network, wired or wireless, using any protocol as described herein. Processor 103 can include a single central processing unit (CPU), which can be a single-core or multi-core processor (e.g., dual-core, quad-core, etc.), or can include multiple CPUs. Processor(s) 103 and associated components can allow the computing device 101 to execute a series of computer-readable instructions to perform some or all of the processes described herein. Although not shown in FIG. 1, various elements within memory 115 or other components in computing device 101, can include one or more caches, for example, CPU caches used by the processor 103, page caches used by the operating system 117, disk caches of a hard drive, and/or database caches used to cache content from database 121. For implementations including a CPU cache, the CPU cache can be used by one or more processors 103 to reduce memory latency and access time. A processor 103 can retrieve data from or write data to the CPU cache rather than reading/writing to memory 115, improving the speed of these operations. In some examples, a database cache can be created in which certain data from a database 121 is cached in a separate smaller database in a memory separate from the database, such as in RAM or on a separate computing device.

In certain aspects of the present disclosure, the computing device 101 may include a weather identification circuit 122. The weather identification circuit 122 may be used to determine a current weather status or forecast a future weather status. For instance, the weather identification circuit 122 may receive data from one or more weather sensors 180, or determine/forecast weather using meteorologist data that may be received via the communication interface 111. The computing device 101 may also include a power distribution circuit 124 that may control the distribution of power based on the weather data derived by the weather identification circuit 122. In some aspects, the weather identification circuit 122 and power distribution circuit 124 may be implemented in software or hardware, or a combination of software and hardware. Weather identification circuit 122 and power distribution circuit 124 may be implemented as part of processor 103, in some aspects. The computing device 101 may be coupled to short term energy storage 183, medium term energy storage 182, and long term energy storage 178. The computing device 101 may also be coupled to and control a renewable energy system 184, such as systems for generation of wind power via wind turbines and solar power via solar panels and solar thermal. The renewable energy system may provide power to a load 186. The short, medium, and long term energy storage may also be coupled to the load and used to supplement the power generated by the renewable energy system. The weather sensors 180 may be operable to detect one or more of wind speed, wind direction, humidity, temperature, atmospheric pressure, etc.

In some aspects, the computing device 101 may include a tracker control circuit 126. The tracker control circuit 126 may control trackers for changing the orientations of photovoltaic panels based on weather data.

Some aspects provide systems and techniques for operating a renewable energy matrix (e.g., a power distribution matrix) such that the time constants t of the energy storage matrix improve the performance of renewable energy generation. For example, when renewable energy input such as photovoltaic or wind power dips for a short time (small t) condition, then short term (small t) energy storage may be used (e.g., discharged) to augment production. As used herein, short term energy storage, medium term energy storage, and long term energy storage refer to how long a particular type of energy takes to generate and store. For example, battery charging can occur in a relative short amount of time and may be referred to as short term energy storage, whereas hydrogen generation and storage take a relatively longer period of time and may be referred to as medium term energy storage or long term-energy storage. Hydrogen may be stored at different pressures. Thus, storing the hydrogen at a higher pressure may implement long term energy storage and storing the hydrogen at a lower pressure may implement medium term energy storage.

Where renewable energy input power dips in a longer time condition, then the longer time (longer τ) energy storage means may be used (e.g., discharged) to augment production. The power generation system may use transducers such as heat engines, electrolyzers and fuel cell generators to move power from one node of the renewable energy matrix to another. For example, energy may be distributed from medium and long term energy storage to short term energy storage in some scenarios, as described in more detail herein.

When the weather is anticipated to be poor for a long period of time and long t energy storage are filled, but the weather is subsequently found to be improved, energy may be moved from long term energy storage to short term storage and/or fully out of the system (e.g., provided to the load) if weather is no longer anticipated to be poor. Since often one long term storage may have more fixed energy loss than another, the long term storage may be set to hold energy for seasons or years without loss by, for example, moving energy stored in batteries and thermal energy storage which have substantial fixed losses with time toward hydrogen storage which has little fixed loss with time.

In some aspects, stored energy in the matrix may be used to execute hotel functions of the renewable energy input equipment. For instance, the stored energy (e.g., battery or hydrogen energy) may be used to operate trackers (e.g., as controlled by tracker control circuit 126) for solar panels of the PV generator. The trackers may be used to orient the panels to face different directions depending on the direction of light from the sun. The trackers may also orient panels due to inclement weather. For instance, the panels may be oriented horizontally if there is high wind, as described herein. In some cases, the stored energy may be used for turbine rotation (e.g., jacking of gears) during times of low wind (e.g., to prevent or reduce settling of grease and bowing of rotors).

In some aspects, long term energy storage may be used as a means to move photovoltaic trackers for protection from wind or other service-based manipulations at times when grid energy and photovoltaic energy are unavailable. When there is a large storm, the risk of drawing power from utility lines is high because of the risk of lightning strikes on the grid infrastructure. And, because storms may occur at night, photovoltaic energy will not be available. Thus, fuel cell power from stored hydrogen may be used since fuel cell power is available at night and during storms.

Figure 2:
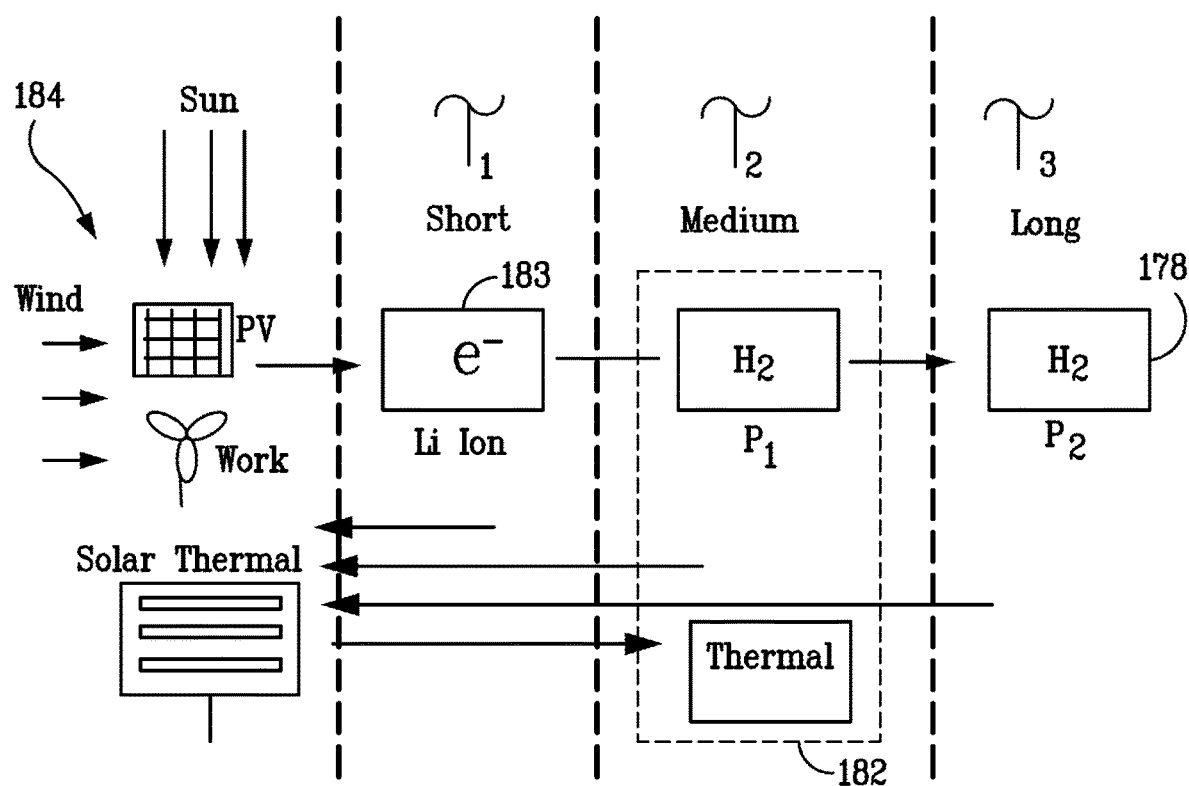
FIG. 2 illustrates different means of storage associated with different time constants, in accordance with certain aspects of the present disclosure.

FIG. 2 illustrates different means of storage associated with different time constants, in accordance with certain aspects of the present disclosure. As described, the power generation system 100 may include short term energy storage 183, medium term storage 182, and long term storage 178, in some aspects. Short term storage may include battery storage (e.g., using Lithium Ion batteries). Medium term storage may include hydrogen or thermal storage. Long term storage may include hydrogen storage, where the hydrogen pressure is higher than the hydrogen pressure for the medium term storage, as shown.

In some aspects, if the weather identification circuit 122 forecasts a storm, the short term storage may be filled (e.g., batteries charged). Once the storm event occurs and if the storage event is forecast to be a short storm, the short term storage may be used to supplement the output power from renewable energy sources (e.g., PV and wind generators). For example, the short term storage 183 may provide power to the load 186 to supplement any power provided to the load by the renewable energy system 184. If the storm event is forecasted to be a long term storm, the short term storage may be used and the medium term storage may recharge the short term storage (e.g., batteries), allowing the short term storage to supplement the output power from the renewable energy sources throughout the duration of the storm.

If an event is forecasted to be a long term storm event (e.g., a disaster event), the long term storage may be used. For example, the long term storage may be used to refill the medium and short term storage while the medium and short term storage are used to supplement the renewable energy output. In some aspects, heat energy (e.g., solar heat or waste heat produced by equipment) that would otherwise be wasted may be captured and stored as thermal energy (e.g., medium term storage).

In some aspects, once the storm ends, the various energy storage equipment may be refilled. In some aspects, the short term storage may be recharged first, followed by the medium term storage and the long term storage (e.g., using the power from the short term storage). In some aspects, once thermal storage is full, a heat engine (e.g., generator) may be used to generate electricity, which may be used to fill hydrogen storage (e.g., medium and long term hydrogen storage).

In some aspects, hydrogen fuel cell power (e.g., from medium and long term storage) may be used to operate a wind turbine. For example, hydrogen power may be used to turn turbine gears to prevent issues with grease setting or rotor bowing in the wind turbine structure. For instance, when there is little to no wind, wind turbines may not spin which may cause the grease for the turbines to settle and/or the rotors of the turbine to bow. Power from hydrogen storage may be used to spin the turbines when there is no wind to prevent (or at least reduce) the settling of the grease and bowing of the rotors.

In some aspects, the power generation system may monitor within the transducer element power electronics for read back of AC-induced ripple and use such read back to monitor for changes in insulation, motor performance, or cell operation. For example, the power generation system may induce an AC ripple at a node of the renewable energy system, and monitor the response to the AC ripple (e.g., perform a frequency response analysis). Based on the response, the power generation system 100 may identify any anomalies that may be indicative of issues in insulation, motor performance, or cell operation.

Figure 3:
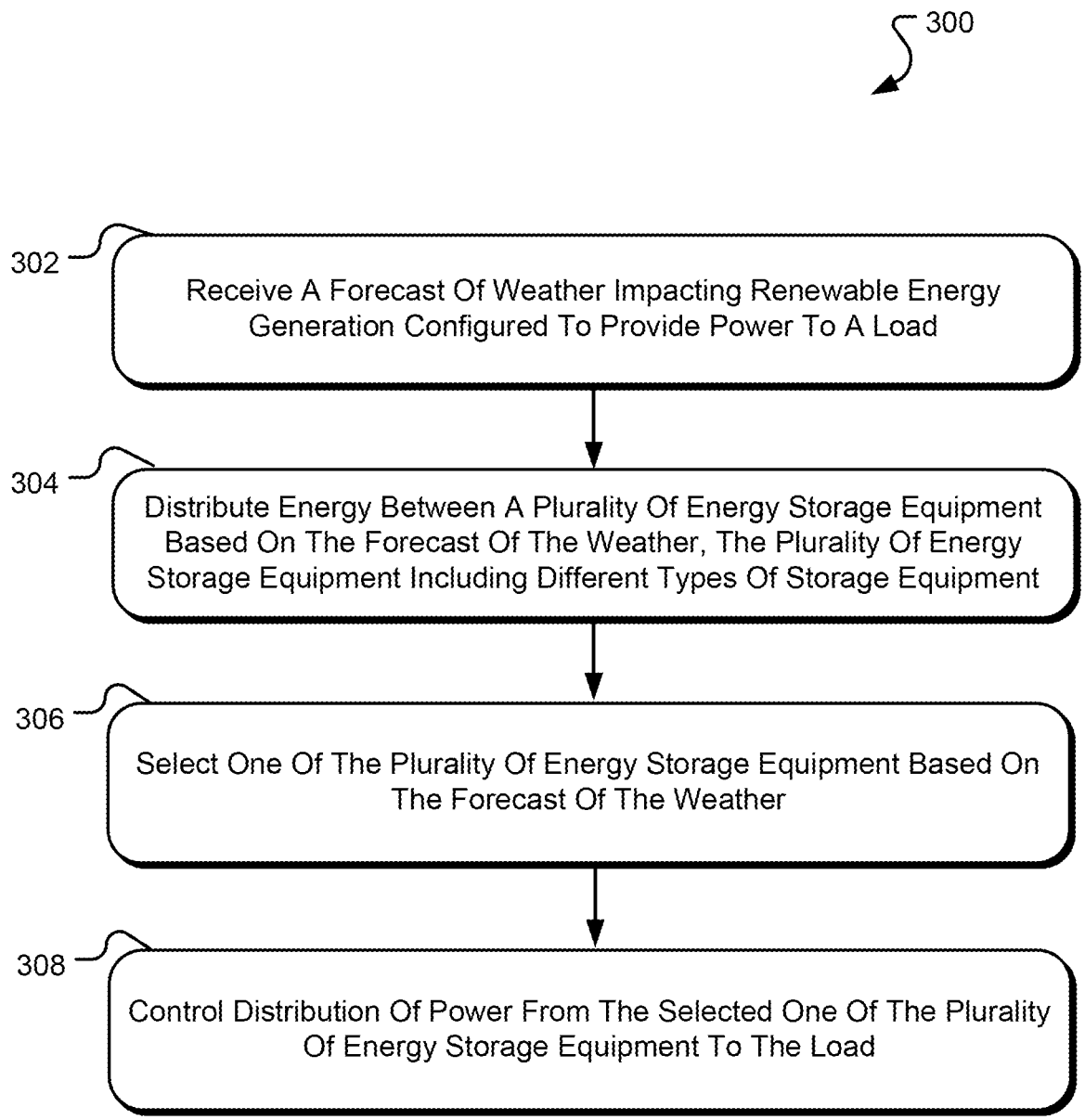
FIG. 3 is a flow diagram illustrating example operations for power generation, in accordance with certain aspects of the present disclosure.

FIG. 3 is a flow diagram illustrating example operations 300 for power generation, in accordance with certain aspects of the present disclosure. The operations 300 may be performed, for example, by a power generation system such as the power generation system 100.

At block 302, the power generation system may receive a forecast of weather impacting renewable energy generation configured to provide power to a load. At block 304, the power generation system distributes energy between a plurality of energy storage equipment based on the forecast of the weather, the plurality of energy storage equipment including different types of storage equipment. The short term energy storage may include a battery, the medium term energy storage includes hydrogen stored at a first pressure, and the long term energy storage includes hydrogen stored at a second pressure greater than the first pressure. In some aspects, the medium term energy storage further includes thermal storage.

At block 306, the power generation system selects one of the plurality of energy storage equipment based on the forecast of the weather. The different types of energy storage may include at least two of short term energy storage, medium term energy storage, or long term energy storage. The power generation system may fill the short term energy storage in response to the forecast indicating a storm event. In some aspects, the selected one of the plurality of power storage equipment includes the short term energy storage in response to the forecast indicating a short term storm event.

In some aspects, in response to the forecast indicating a long term storm event, the selected one of the plurality of power storage equipment may include the short term energy storage (e.g., to supplement power from renewable energy). Moreover, distributing the power may include filling the short term energy storage using the medium term energy storage. In some aspects, in response to the forecast indicating a long term storm event, the selected one of the plurality of storage equipment may include the long term energy storage (e.g., to supplement power from renewable energy).

At block 308, the power generation system controls distribution of power from the selected one of the plurality of energy storage equipment to the load. In some aspects, the renewable energy generation is via solar thermal energy generation equipment. The power generation system may provide excess energy from one or more of the plurality of energy storage equipment to the solar thermal energy generation equipment.

In some aspects, the renewable energy generation is via one or more solar panels. The power generation system may provide energy from one or more of the plurality of energy storage equipment to power a tracker configured to adjust an orientation of the one or more solar panels. In some aspects, the renewable energy generation is via one or more wind turbines. The power generation system may provide energy from one or more of the plurality of energy storage equipment to rotate the one or more wind turbines when wind speed is less than a threshold.

In certain aspects, the power generation system may inject an AC signal to a node associated with the renewable energy generation. The power generation system may monitor a signal at the node for fault detection.

Figure 4:
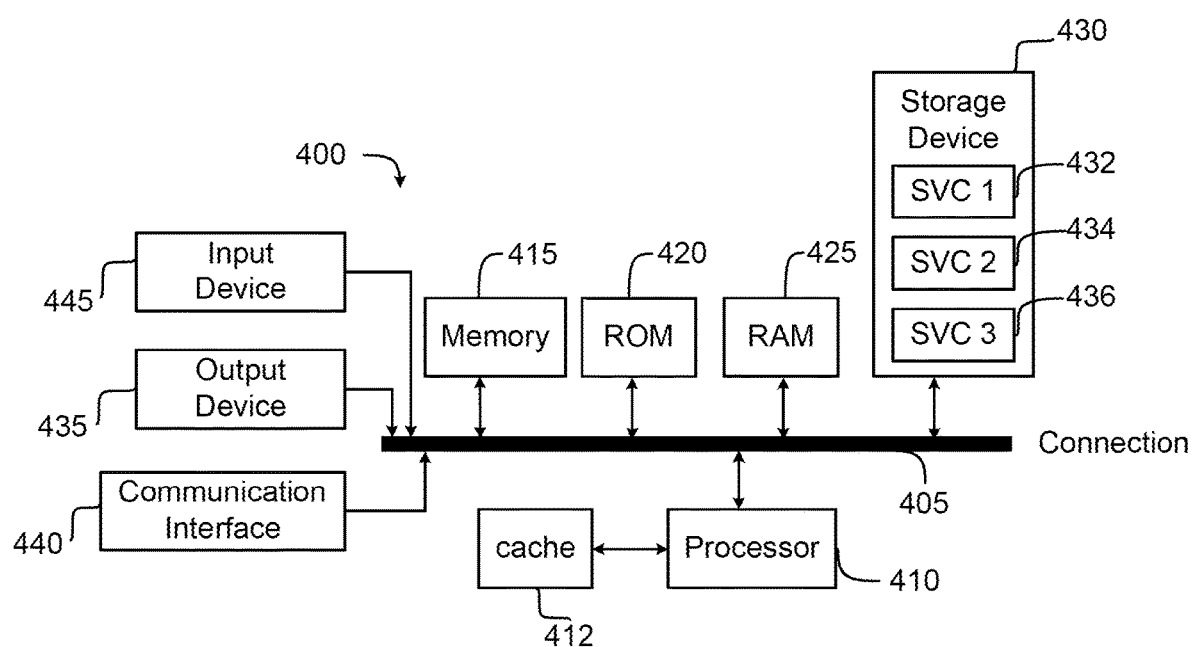
FIG. 4 illustrates an architecture of a computing system.

FIG. 4 illustrates an architecture of a computing system 400 wherein the components of the system 400 are in electrical communication with each other using a connection 405, such as a bus. Exemplary system 400 includes a processing unit (CPU or processor) 410 and a system connection 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410.

The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general purpose processor and a hardware or software service, such as service 1 432, service 2 434, and service 3 436 stored in storage device 430, configured to control the processor 410 as well as a special-purpose processor where software instructions are incorporated into the actual processor design. The processor 410 may be a completely self-contained computing system, containing multiple cores or processors, a bus, memory controller, cache, etc. A multi-core processor may be symmetric or asymmetric.

To enable client interaction with the computing system 400, an input device 445 can represent any number of input mechanisms, such as a microphone for speech, a touch-sensitive screen for gesture or graphical input, key board, mouse, motion input, speech and so forth. An output device 435 can also be one or more of a number of output mechanisms known to those of skill in the art. In some instances, multimodal systems can enable a client to provide multiple types of input to communicate with the computing system 400. The communications interface 440 can generally govern and manage the client input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include services 432, 434, 436 for controlling the processor 410. Other hardware or software modules are contemplated. The storage device 430) can be connected to the system connection 405. In one aspect, a hardware module that performs a particular function can include the software component stored in a computer-readable medium in connection with the necessary hardware components, such as the processor 410, connection 405, output device 435, and so forth, to carry out the function.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the concepts in this disclosure may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" or "one or more of" a set indicates that one member of the set or multiple members of the set satisfy the claim. For example, claim language reciting "at least one of A and B" means A, B, or A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor: but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules.

Example Aspects

Clause 1. A method for power generation, comprising: receiving a forecast of weather impacting renewable energy generation configured to provide power to a load: distributing energy between a plurality of energy storage equipment based on the forecast of the weather, the plurality of energy storage equipment including different types of storage equipment: selecting one of the plurality of energy storage equipment based on the forecast of the weather; and controlling distribution of power from the selected one of the plurality of energy storage equipment to the load.

Clause 2. The method of clause 1, wherein the different types of energy storage include at least two of short term energy storage, medium term energy storage, or long term energy storage.

Clause 3. The method of clause 2, further comprising filling the short term energy storage in response to the forecast indicating a storm event.

Clause 4. The method of any one of clauses 2-3, wherein the selected one of the plurality of power storage equipment includes the short term energy storage in response to the forecast indicating a short term storm event.

Clause 5. The method of any one of clauses 2-4, wherein, in response to the forecast indicating a long term storm event: the selected one of the plurality of power storage equipment includes the short term energy storage; and distributing the power includes filling the short term energy storage using the medium term energy storage.

Clause 6. The method of any one of clauses 2-5, wherein, in response to the forecast indicating a long term storm event, the selected one of the plurality of storage equipment includes the long term energy storage.

Clause 7. The method of any one of clauses 2-6, wherein: the short term energy storage includes a battery: the medium term energy storage includes hydrogen stored at a first pressure; and the long term energy storage includes hydrogen stored at a second pressure greater than the first pressure.

Clause 8. The method of clause 7, wherein the medium term energy storage further includes thermal storage.

Clause 9. The method of any one of clauses 1-8, wherein the renewable energy generation is via solar thermal energy generation equipment, the method further comprising providing excess energy from one or more of the plurality of energy storage equipment to the solar thermal energy generation equipment.

Clause 10. The method of any one of clauses 1-9, wherein the renewable energy generation is via one or more solar panels, the method further comprising providing energy from one or more of the plurality of energy storage equipment to power a tracker configured to adjust an orientation of the one or more solar panels.

Clause 11. The method of any one of clauses 1-10, wherein the renewable energy generation is via one or more wind turbines, the method further comprising providing energy from one or more of the plurality of energy storage equipment to rotate the one or more wind turbines when wind speed is less than a threshold.

Clause 12. The method of any one of clauses 1-11, further comprising: injecting an alternating current (AC) signal to a node associated with the renewable energy generation; and monitoring a signal at the node for fault detection.

Clause 13. An apparatus for power generation, comprising: a memory; and one or more processors coupled to the memory, the one or more processors being configured to: receive a forecast of weather impacting renewable energy generation configured to provide power to a load: distribute energy between a plurality of energy storage equipment based on the forecast of the weather, the plurality of energy storage equipment including different types of storage equipment: select one of the plurality of energy storage equipment based on the forecast of the weather; and control distribution of power from the selected one of the plurality of energy storage equipment to the load.

Clause 14. The apparatus of clause 13, wherein the different types of energy storage include at least two of short term energy storage, medium term energy storage, or long term energy storage.

Clause 15. The apparatus of clause 14, the one or more processors are further configured to fill the short term energy storage in response to the forecast indicating a storm event.

Clause 16. The apparatus of any one of clauses 14-15, wherein the selected one of the plurality of power storage equipment includes the short term energy storage in response to the forecast indicating a short term storm event.

Clause 17. The apparatus of any one of clauses 14-16, wherein, in response to the forecast indicating a long term storm event: the selected one of the plurality of power storage equipment includes the short term energy storage; and to distribute the power, the one or more processors fill the short term energy storage using the medium term energy storage.

Clause 18. The apparatus of any one of clauses 14-17, wherein, in response to the forecast indicating a long term storm event, the selected one of the plurality of storage equipment includes the long term energy storage.

Clause 19. The apparatus of any one of clauses 14-19, wherein: the short term energy storage includes a battery: the medium term energy storage includes hydrogen stored at a first pressure; and the long term energy storage includes hydrogen stored at a second pressure greater than the first pressure.

Clause 20. A non-transitory computer-readable medium having instructions stored thereon, that when executed by one or more processors, cause the one or more processors to: receive a forecast of weather impacting renewable energy generation configured to provide power to a load: distribute energy between a plurality of energy storage equipment based on the forecast of the weather, the plurality of energy storage equipment including different types of storage equipment: select one of the plurality of energy storage equipment based on the forecast of the weather; and control distribution of power from the selected one of the plurality of energy storage equipment to the load.

What is claimed is:

1. A method for power generation and storage, the method comprising:
receiving a forecast of weather impacting renewable energy generation configured to provide power to a load;
distributing energy between a plurality of different types of energy storage equipment based on the forecast of the weather, the plurality of different types of energy storage equipment including different types of storage equipment with different storage terms, wherein the plurality of different types of energy storage equipment includes short-term energy storage and medium-term energy storage;
selecting one of the plurality of different types of energy storage equipment based on the forecast of the weather; and
controlling distribution of power from the selected one of the plurality of different types of energy storage equipment to the load;
wherein, in response to the forecast indicating a long term storm event:
the selected one of the plurality of different types of energy storage equipment includes the short-term energy storage; and
distributing the power includes filling the short-term energy storage using the medium-term energy storage.

2. The method of claim 1, wherein, in response to the forecast indicating a long term storm event, the selected one of the plurality of different types of energy storage equipment includes a long term energy storage.

3. The method of claim 1, wherein:
the short-term energy storage includes a battery;
the medium-term energy storage includes hydrogen stored at a first pressure; and
a long term energy storage of the plurality of different types of energy storage equipment includes hydrogen stored at a second pressure greater than the first pressure.

4. The method of claim 3, wherein the medium-term energy storage further includes thermal storage.

5. The method of claim 1, wherein the renewable energy generation is via solar thermal energy generation equipment, the method further comprising providing excess energy from one or more of the plurality of different types of energy storage equipment to the solar thermal energy generation equipment.

6. The method of claim 1, wherein the renewable energy generation is via one or more solar panels, the method further comprising providing energy from one or more of the plurality of different types of energy storage equipment to power a tracker configured to adjust an orientation of the one or more solar panels.

7. The method of claim 1, wherein the renewable energy generation is via one or more wind turbines, the method further comprising providing energy from one or more of the plurality of different types of energy storage equipment to rotate the one or more wind turbines when wind speed is less than a threshold.

8. The method of claim 1, further comprising:
injecting an alternating current (AC) signal to a node associated with the renewable energy generation; and
monitoring a signal at the node for fault detection.

9. An apparatus for power generation and storage, the apparatus comprising:
a memory; and
one or more processors coupled to the memory, the one or more processors being configured to:
receive a forecast of weather impacting renewable energy generation configured to provide power to a load;
distribute energy between a plurality of different types of energy storage equipment based on the forecast of the weather, the plurality of different types of energy storage equipment including different types of storage equipment with different storage terms, wherein the plurality of different types of energy storage equipment includes short-term energy storage and medium-term energy storage;
select one of the plurality of different types of energy storage equipment based on the forecast of the weather; and
control distribution of power from the selected one of the plurality of different types of energy storage equipment to the load;
wherein, in response to the forecast indicating a long term storm event:
the selected one of the plurality of different types of energy storage equipment includes the short-term energy storage; and
distributing the power includes filling the short-term energy storage using the medium-term energy storage.

10. The apparatus of claim 9, wherein, in response to the forecast indicating a long term storm event, the selected one of the plurality of different types of energy storage equipment includes a long term energy storage.

11. The apparatus of claim 9, wherein:
the short-term energy storage includes a battery;
the medium-term energy storage includes hydrogen stored at a first pressure; and
a long term energy storage of the plurality of different types of energy storage equipment includes hydrogen stored at a second pressure greater than the first pressure.

12. A non-transitory computer-readable medium having instructions stored thereon, that when executed by one or more processors, cause the one or more processors to:
receive a forecast of weather impacting renewable energy generation configured to provide power to a load;
distribute energy between a plurality of different types of energy storage equipment based on the forecast of the weather, the plurality of different types of energy storage equipment including different types of storage equipment with different storage terms, wherein the plurality of different types of energy storage equipment includes short-term energy storage and medium-term energy storage;
select one of the plurality of different types of energy storage equipment based on the forecast of the weather; and
control distribution of power from the selected one of the plurality of different types of energy storage equipment to the load;
wherein, in response to the forecast indicating a long term storm event:

the selected one of the plurality of different types of energy storage equipment includes the short-term energy storage; and distributing the power includes filling the short-term energy storage using the medium-term energy storage.

* * * * *